(12) United States Patent
Dunn

(10) Patent No.: US 7,359,872 B2
(45) Date of Patent: Apr. 15, 2008

(54) SYSTEM AND METHOD FOR CALCULATING PARAMETERS FOR A COMMERCE SYSTEM

(75) Inventor: Robert M. Dunn, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 712 days.

(21) Appl. No.: 09/997,979

(22) Filed: Nov. 30, 2001

(65) Prior Publication Data

US 2002/0065740 A1 May 30, 2002

(30) Foreign Application Priority Data

Nov. 30, 2000 (CA) .................................. 2327085

(51) Int. Cl.
*G06Q 30/00* (2006.01)
(52) U.S. Cl. ...................................................... 705/26
(58) Field of Classification Search ................... 705/20
See application file for complete search history.

(56) References Cited

U.S. PATENT DOCUMENTS 5,878,400 A * 3/1999 Carter, III ................... 705/20
5,897,602 A 4/1999 Mizuta
6,058,373 A 5/2000 Blinn et al.

FOREIGN PATENT DOCUMENTS

| CA | 2315091 A1 | 7/1999 |
| CA | 2359897 A1 | 8/2000 |

OTHER PUBLICATIONS

Baron, "Electronic Commerce with SoftCart", newarchitect, 1996, pp. 1-4, retrieved Aug. 24, 2007 http://www.webtechniques.com/archives/1996/10/note/.

* cited by examiner

*Primary Examiner*—R Weisberger
(74) *Attorney, Agent, or Firm*—Duke W. Yee; A. Bruce Clay; Lisa L. B. Yociss

(57) ABSTRACT

A method and system for processing a parameter for an item in an electronic order processing system is provided. The method has a first step of associating a calculation code with the item. The second step of the method is applying the calculation rule to the item to produce an amount. The third step of the method is providing the amount to an output device. Each operation within each of the first step, the second step and the third step may be modified and flow of execution amongst the first step, the second step and the third step remains the same.

7 Claims, 15 Drawing Sheets

Figure 4

Main Module 400

Call CalculationCodeCombineMethod (list of {Item})    408    514

⇐ list of {CalculationCode, list of {Item, [list of {Amount}]}}, m₁ in list

For each m₁    526

If no Amounts    410

Call CalculationCodeCalculateMethod (CalculationCode, list of {Item})

⇐ list of {Item, list of {Amount}}    612'

Call CalculationCodeApplyMethod (list of {Item, list of {Amount}})

CalculationCodeCombineMethod (list of {Item}) – discounts, shipping

Associate CalculationCodes (list of {Item})         — 510
⇐ list of {CalculationCode, list of {Item}}, $m_i$ in list For each $m_i$ Call CalculationCodeQualifyMethod (CalculationCode, list of {Item})
    ⇐ CalculationCode, list of {Item, [list of {Amount}]}       512
    520        510'

Sort (list of {CalculationCode, list of {Item, [list of {Amount}]}}) by sequence attribute Return (list of {CalculationCode, list of {Item, [list of {Amount}]}})        520
        514

Figure 6

CalculationCodeCalculateMethod (CalculationCode, list of {Item})

Call CalculationRuleCombineMethod (CalculationCode, list of {Item}) — 410

⇐ list of {CalculationRule, list of {Item, [list of {Amount}]}}, $n_x$ in list — 520

For each $n_x$

If no Amounts

Call CalculationRuleCalculateMethod (CalculationRule, list of {Item}) — 610

⇐ list of {Item, Amount} — 612

Sum into list of {Item, list of {Amount}}

Return (list of {Item, list of {Amount}}) — 612'

Figure 7

One order item 202 - Boots 700 – unit price 702 - $100.00

Calculation Code 200 associated with boots 700

- discount 706

Calculation Rule 204 associated with discount 706

- discount A 708 - 10% off unit price

Figure 8

CalculationCodeCombineMethod(boots) /240 /700

Associate CalculationCodes (boots) /700

Gives: discount, boots

CalculationCodeQualifyMethod (discount, boots) /302 /706 /700

Gives: discount, boots as qualified — 510

Sort list of qualified calculation codes gives: 1. discount, boots

Return: 1. discount, boots 514

1.    Discount, boots

No Amount, so

CalculationCodeCalculateMethod (discount, boots) /242 /706 /700

CalculationRuleCombineMethod (discount A, boots) /308 /708 /700

Gives: discount A, boots /708 /700

No Amount, so

CalculationRuleCalculateMethod (discount A, boots) /246 /708 /700

Gives: boots, -$10.00 discount — 860 summed list: boots, -$10.00 discount — 800

Return: boots, -$10.00 discount — 800 610

CalculationCodeApplyMethod (boots, -$10.00 discount) /244 /700 /800

Gives: Boots unit price $100.00, discount A -$10.00, adjusted unit price $90.00

Items 202(x)

- Boots 1000 – unit price 702 – $100.00
- Shoes 1002 x 2 – unit price 702 – $40.00
- Socks 1004 – unit price 702 – $2.00

Calculation Codes 200(x) associated with boots 1000

- shipping code 1 1010
  - sequence 304 = 5
- shipping code 2 1014
  - sequence 304 = 1
  - applicable if buying more than one pair Calculation Codes 200(x) associated with shoes 1002

- shipping code 1 1010
  - sequence 304 = 5
- shipping code 2 1014
  - sequence 304 = 1
  - applicable if buying more than one pair Calculation Codes 200(x) associated with socks 1004

- shipping code 1 1010
  - sequence 304 = 5
- shipping code 2 1014
  - sequence 304 = 1
  - applicable if buying more than one pair Figure 10 continued – 2

Calculation Rules 204(x) associated with shipping code 1 1010
- shipping A 1020
    - add $4.00 per unit
    - allowable combination 306 = in addition to
    - for shipping within the country
- shipping surcharge A 1022
    - add 5% surcharge on shipping charge if within a date range specified
    - allowable combination 306 = in combination with
    - for shipping within the country
- shipping surcharge B 1024
    - add 10% surcharge on shipping charge if there is not already a surcharge
    - allowable combination 306 = not in combination with
    - for shipping within the country
- shipping D 1026
    - add $10.00 per unit
    - allowable combination 306 = in addition to
    - for shipping outside of the country Calculation Rules 204(x) associated with shipping code 2 1014
- shipping X 1028 - $2.00 added to total
    - allowable combination 306 = in addition to

Figure 11

CalculationCodeCombineMethod (boots, shoes x 2, socks)
    Associate CalculationCodes (boots, shoes x 2, socks)
        Gives: shipping code 1, {boots, shoes x 2, socks}; shipping code 2, {boots, shoes x 2, socks}
        CalculationCodeQualifyMethod (shipping code 1, {boots, shoes x 2, socks})
        Gives: shipping code 1, {boots, shoes x 2, socks} as qualified
        CalculationCodeQualifyMethod (shipping code 2, {boots, shoes x 2, socks})
        Gives: shipping code 2, {shoes x 2} as qualified
    Sort list of qualified calculation codes gives: 1. shipping code 2, {shoes x 2}; 2. shipping code 1, {boots, shoes x 2, socks}
    Return: 1. shipping code 2, {shoes x 2}; 2. shipping code 1, {boots, shoes x 2, socks}

1.     Shipping code 2, {shoes x 2}
    No Amount, so
        CalculationCodeCalculateMethod (shipping code 2, {shoes x 2})
            CalculationRuleCombineMethod (shipping code 2, {shoes x 2})
            Gives: shipping X, {shoes x 2}
            No Amount, so
                CalculationRuleCalculateMethod (shipping X, {shoes x 2})
            Gives: shipping X, {shoes x 2, $2.00}
            summed list: shipping X, {shoes x 2, $2.00}
            Return: shipping X, {shoes x 2, $2.00}
    CalculationCodeApplyMethod (shipping X, {shoes x 2, $2.00})
    Gives: {Boots unit price $100.00}, {shoes x 2 unit price $40.00, shipping X $2.00}, {socks unit price $2.00}

2.     Shipping code 1, {boots, shoes x 2, socks}
    No Amount, so
        CalculationCodeCalculateMethod (shipping code 1, {boots, shoes x 2, socks})

Figure 11 continued – 2

CalculationRuleCombineMethod (shipping code 1, {boots, shoes x 2, socks}) /308

Gives: shipping A, {boots, shoes x 2, socks}; shipping surcharge A, {boots, shoes x 2, socks} /1020 /1022

No Amount, so

CalculationRuleCalculateMethod (shipping A, {boots, shoes x 2, socks})

Gives: {boots, $4.00}, {shoes x 2, $4.00}, {socks, $4.00}, shipping A summed list: {boots, $4.00}, {shoes x2, $4.00}, {socks, $4.00}, shipping A CalculationRuleCalculateMethod (shipping surcharge A, {boots, shoes x 2, socks})

Gives: {boots, $0.20}, {shoes x 2, $0.20}, {socks, $0.20}, shipping surcharge summed list: {boots, $4.00, $0.20}, {shoes x 2, $4.00, $0.20}, {socks, $4.00, $0.20}

CalculationCodeApplyMethod ({boots, $4.00, $0.20}, {shoes x 2, $4.00, $0.20}, {socks, $4.00, $0.20})

Gives: {Boots unit price $100.00, shipping A $4.00, shipping surcharge A $0.20}, {shoes x 2 unit price $40.00, shipping X $2.00, shipping A $4.00, shipping surcharge A $0.20}, {socks unit price $2.00, shipping A $4.00, shipping surcharge A $0.20}

Figure 12

Final Order - boots 1000, shoes 1002 x 2, socks 1004

| | | |
|---|---|---|
| Boots 1000 Unit price | $100.00 | $100.00 |
| | | |
| Shoes 1002 Unit price | $40.00 | $80.00 |
| | | |
| Socks 1004 Unit price | $2.00 | $2.00 |
| | | |
| Shoes 1002 Shipping X 1028 | $2.00 | |
| Shipping Code 2 | $2.00 | $2.00 |
| | | |
| Boots 1000 Shipping A 1020 | $4.00 | |
| Shoes 1002 Shipping A 1020 | $8.00 | |
| Socks 1004 Shipping A 1020 | $4.00 | |
| Shipping Code 1 | $16.00 | $16.00 |
| | | |
| Boots 1000 Shipping surcharge A 1022 | $0.20 | |
| Shoes 1002 Shipping surcharge A 1022 | $0.40 | |
| Socks 1004 Shipping surcharge A 1022 | $0.20 | |
| Shipping surcharge | $0.80 | $0.80 |
| | | |
| Total 1200 | | $200.80 |

SYSTEM AND METHOD FOR CALCULATING PARAMETERS FOR A COMMERCE SYSTEM

FIELD OF THE INVENTION

The invention relates generally to a system and method for calculating parameters of items associated with a commerce system, in particular, items selected electronically from an e-commerce system.

BACKGROUND OF THE INVENTION

The development of the EDVAC computer system of 1948 is often cited as the beginning of the computer era. Since that time, computers have grown in power and become more compact resulting in more and more companies, organizations, and institutions using computers to satisfy their daily needs. As companies, organizations, and institutions began to have more than one computer, a need for a method of transferring data among them became prevalent. To do so, internal networks were developed to allow computers to share data and work together.

As well as building internal networks, companies, organizations, and institutions also began to build external networks to share and transfer information among one another. The Internet, which is simply a computer network, grew from this trend towards increasing connectivity. The Internet is a network of millions of computers throughout the world connected to one another. It provides a user with access to all of these computers and, their resources, all from the comforts of his or her own computer. It is this global reach that has attracted merchants to use the Internet as a new marketplace in which to sell their wares.

When a merchant offers products for sale on the Internet, a customer will typically be able to access the list of catalogue items the merchant is offering for sale and information concerning those catalogue items in order to make a decision on whether or not to make a purchase. The customer can then order the desired items over the Internet and complete the purchase remotely. The computer program that allows this functionality is generally called an electronic commerce system, or e-commerce system.

When an item is ordered, apart from the price of the item, there may also be charges or reductions associated with that item. For example, a customer may be charged for shipping the item or he or she may be eligible for a discount. In the past, the manner of calculating parameters, such as charges and reductions, associated with an item have been explicitly programmed or hard coded into the e-commerce system. Hard coding the calculation of parameters into the e-commerce system forces a merchant to physically change the program code for each change in the calculation of those parameters for an item that may be ordered. Additionally, adding new calculations involved writing and inserting entire routines that duplicated operations that would be performed on all items. Changing the program code and adding new program code is time consuming and prone to error.

It is desirable to have an e-commerce system that separates the calculation of the parameters for an item from the item itself to facilitate the changing of the calculations of those parameters and adding new calculations for new parameters.

SUMMARY OF THE INVENTION

In a first aspect, a method for processing a parameter for an item in an electronic order processing system is provided. The method has a first step of associating a calculation code with the item. The second step of the method is applying the calculation rule to the item to produce an amount. The third step of the method is providing the amount to an output device. Each operation within each of the first step, the second step and the third step may be modified and flow of execution amongst first step, the second step and the third step remains the same.

The second step of the met-hod may initially associate a calculation rule with the calculation code and use the calculation rule to produce the amount.

The method also allows for the modification of the calculation rule and flow of execution amongst first step, the second step and the third step remains the same.

The output device may be one of a printer, a display device, a storage medium, a database and a connection device.

The method may also process parameters for a number of items. Additionally, there may be more than one calculation code associated with an item and there may be more than one calculation rule associated with a calculation code.

The first step of method may selectively associate the calculation code with the item. The second step of the method may selectively associate the calculation rule with the calculation code. Finally, the second step of the method may also selectively use the calculation rule to produce the amount.

In another aspect, an electronic order processing system for use in an ordering system responsive to a transaction request associated with an item is provided. The system has a computer receiving the transaction request and a program executed on the computer for processing the transaction request and processing a parameter for the item. The program has an association module for associating a calculation code with the item. It also has calculation module for applying the calculation code to the item to produce an amount. It also has an application module for providing the amount to an output device. Each operation within the association module, the calculation module and the application module may be modified and flow of execution amongst the association module, the calculation module and the application module remains the same.

In a third aspect, method of processing a transaction request relating to an item for use in an order processing system is provided. The item order processing system has a server and access to a database having data associated with the item. The method has the steps of receiving the transaction request from a client of the server and processing the transaction request at the server. The method processes the transaction request at the server by associating a calculation parameter with the item, processing the calculation parameter for the item to calculate an amount, and providing the amount to an output device. Operation of the steps of associating the calculation parameter, processing the calculation parameter and providing the amount to the output device may be modified and flow of execution amongst the steps of associating the calculation parameter, processing the calculation parameter and providing the amount to the output device remains the same.

In another aspect, a computer program embodying a method for processing a parameter for an item is provided. The method has a first step of associating a calculation code with the item. The method has a second step of applying the calculation code to the item to produce an amount. The method has a third step of providing the amount to an output device. Each operation within each of the first step, the second step and the third step may be modified and flow of execution amongst the first step, the second step and the third step remains the same.

In yet another aspect, an electronic order processing system is provided. The system has a computer-readable information storage medium. The system also has a procedure encoded on the storage medium for processing a parameter for an item. The procedure has a first step of associating a calculation code with the item. The procedure has a second step applying the calculation code to the item to produce an amount. The procedure has a third step of providing the amount to an output device. Each operation within each of first step, the second step and the third step may be modified and flow of execution amongst the first step, the second step and the third step remains the same.

In another aspect, an electronic order processing system for processing a parameter for an item in a distributed network is provided. The distributed network has a first computer and a second computer. The system has a computer-readable modulated carrier signal. The system also has a first initiation code embedded in the signal sent from the first computer to the second computer. The first initiation code is sent to initiate a first module for associating a calculation code with the item. The system also has a second initiation code embedded in the signal sent from the first computer to the second computer. The second initiation code is sent to initiate a second module for applying the calculation rule to the item to produce an amount. The system also has a third initiation code embedded in the signal sent from the first computer to the second computer. The third initiation code is sent to initiate a third module for providing the amount to an output device.

The second computer in the distributed network receives the signals and each operation within each of the first module, the second module and the third module may be modified and flow of execution amongst the first module, the second module and the third module remains the same.

It will be appreciated that other aspects may provide various combinations and subsets of the aspects described above.

BRIEF DESCRIPTION OF THE DRAWINGS

The foregoing and other aspects of the invention will become more apparent from the following description of specific embodiments thereof and the accompanying drawings which illustrate, by way of example only the principles of the invention. In the drawings, where like elements feature like reference numerals (and wherein individual elements bear unique alphabetical suffixes):

FIG. 4 is a pseudo-code listing of a top level module of the embodiment of FIG. 1A;

FIG. 5 is a pseudo-code listing of a calculation module of the e-commerce system of FIG. 1A;

FIG. 6 is a pseudo-code listing of a calculation module of the e-commerce system of FIG. 1A;

FIG. 7 is an example of an order item and its associated elements for the e-commerce system of FIG. 1A;

FIG. 8 is a detailed pseudo-code listing of the pseudo-code of FIGS. 4, 5, and 6 applied to the example of FIG. 7;

FIG. 10 is another example of an order and its associated elements for the e-commerce system of FIG. 1A;

FIG. 11 is a listing of the pseudo-code associated with FIGS. 4, 5, and 6 applied to the example of FIG. 10;

FIG. 12 is a table of results produced by the e-commerce system of FIG. 1A for the example in FIG. 10.

DETAILED DESCRIPTION OF THE EMBODIMENTS

Figure 1A:
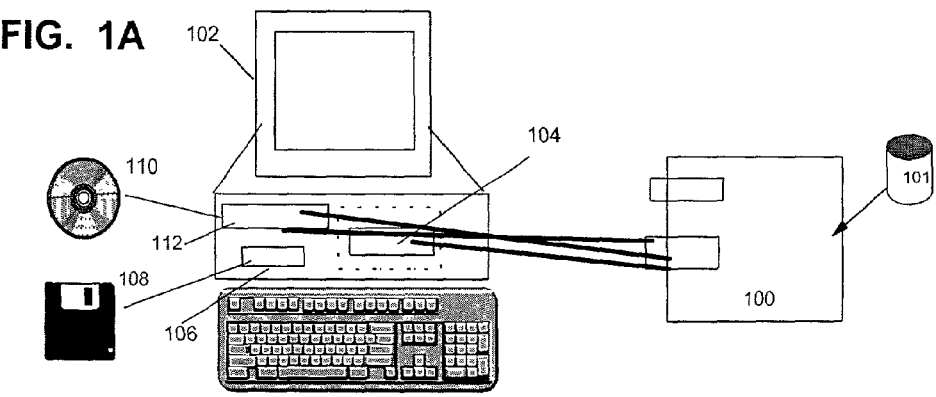
FIG. 1A is a block diagram of a computer operating software providing an e-commerce system using an embodiment.

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

Referring to FIG. 1A, the embodiment provides a method and system for calculating parameters of an item within an e-commerce system 100 within an object-oriented framework. In an object-oriented framework, abstractions are allowed. As such, in e-commerce system 100, items are separated from calculation of a parameter for the item. The rules which carry the instructions on how to calculate the parameters are associated with the item but are not attributes of the item themselves. The embodiment enables modification of the rules for calculating parameters for an item without modifying the code that implements the framework.

E-commerce system 100 is implemented using object-oriented design techniques known in the art. Object-oriented design uses objects and relationships between objects to develop program code that manipulates aspects of the objects efficiently. An object is one particular instance of a thing, for example, a computer, a dog, calculation rule 204(*a*). In programming terms, an object exists at the time a program is executed and takes up memory to store the values of its attributes. Attributes contain the information that defines the object including its data and its individual properties. Objects sharing similar attributes can be grouped into a class. A class of objects defines a common structure of the objects and their behaviour with other objects.

Figure 2:
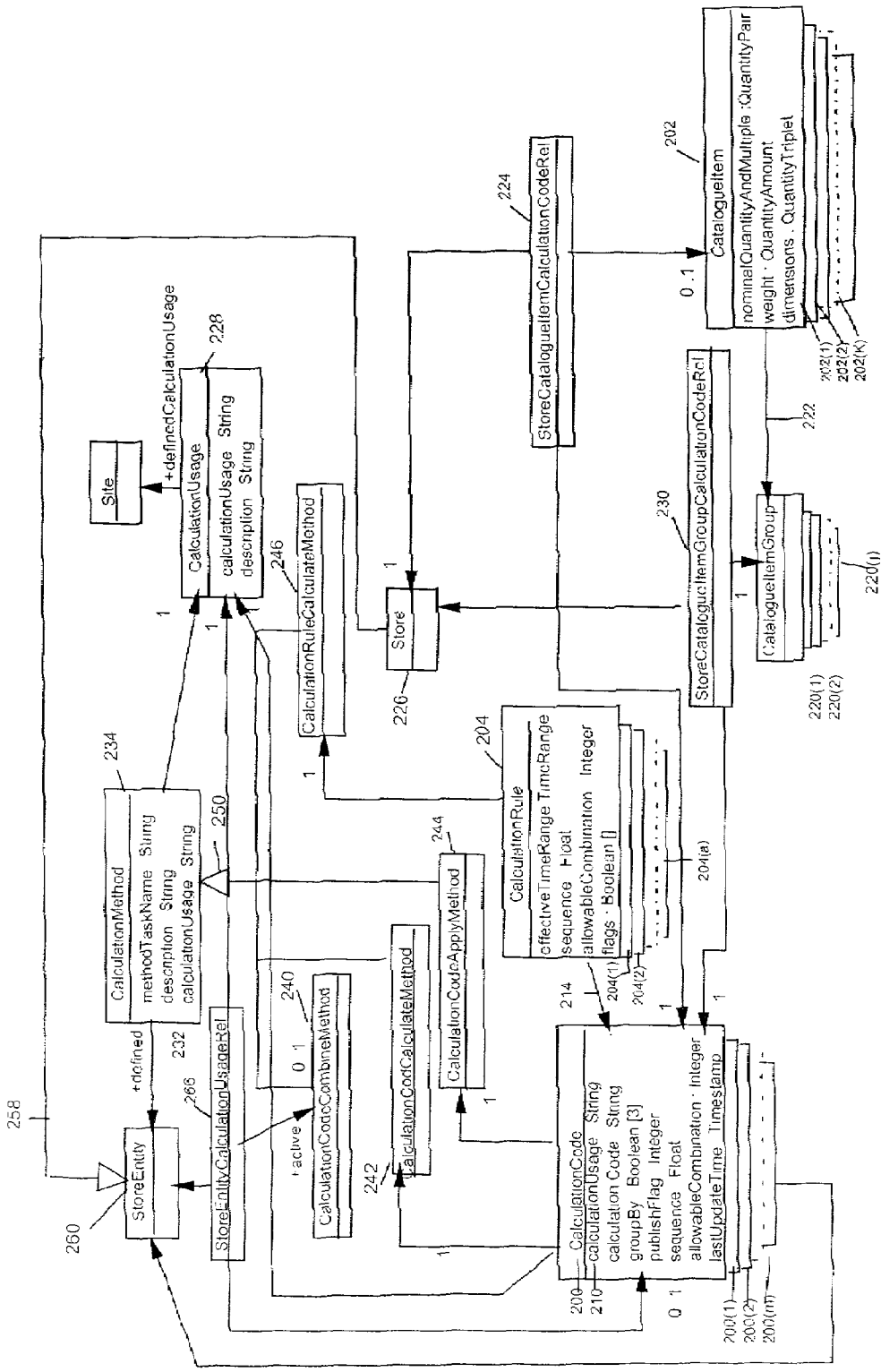
FIG. 2 is a block diagram showing relationships among components of the embodiment of the e-commerce system of FIG. 1A.
Figure 3:
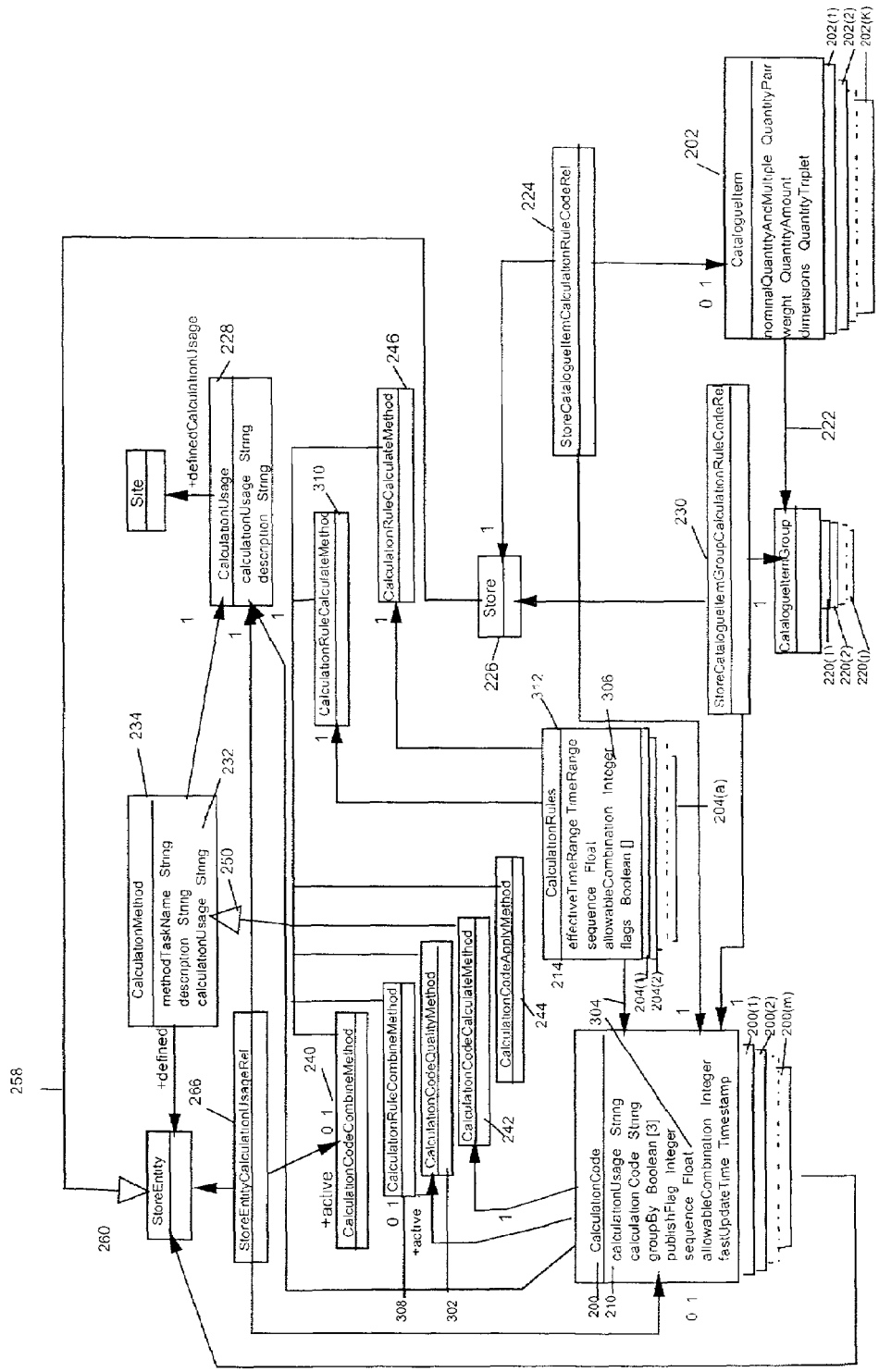
FIG. 3 is a block diagram showing relationships among additional components of the e-commerce system of FIG. 1A.

In the description of the embodiment that follows, objects are referred to as specific instances of a class, e.g., calculation code 200, catalogue item group 220(1), catalogue item 202(*a*) or a calculation rule 204. The classes containing these objects, calculation code 200, catalogue item group 220, catalogue item 202, calculation rule 204, etc. are shown in FIGS. 2 and 3 as rectangles. Objects within a class have common attributes, listed under the name of the class. Lines and arrows connecting the classes indicate relationships existing between the classes.

In class diagrams, a line connecting two classes of objects shows a relationship between the objects. Numbers at the ends of the lines with ordinary arrows, e.g. relationship 1306 in FIG. 13, indicate the cardinality of the relationship. For example, the "1" at the arrow end of the line in relationship 1306 in FIG. 13 indicates that the class of objects on the other end is associated with one, and only one, of the class of objects at the arrow end of the line. A relationship with "0 . . . *" at the arrow end indicates that the class of objects on the other end is associated with zero-to-many of the class of objects at the arrow end of the line. This may also be indicated by a line between two classes of object with no arrow and no number. A relationship with "0 . . . 1" at the arrow end indicates that the class of objects on the other end is associated with zero or one of the class of objects at the arrow end of the line. Other relationships are shown by lines ending in diamonds and open arrows.

Referring to FIG. 2, an open arrow as in relationship 250 at the end of a line represents a generalization. The class of objects to which the arrow points is a generalization of the classes of objects from which the arrow originates. The common properties based on the generalization exist at the generalization, simplifying and facilitating the re-use of program code.

An open diamond in class diagrams at the end of a line, such as relationship 222 in FIG. 2, indicates a grouping relationship between classes of object. Each object at the end of the relationship opposite the open diamond may be contained in more than one group. This relationship is referred to as "aggregation" or "containment by reference".

A solid diamond at the end of a line, such as relationship 214, indicates a grouping relationship between classes of objects but each object at the other end of the relationship may only be contained in one group. This relationship is called "composition" or "containment by value".

E-commerce system 100 is embodied in computer software operating on computer 102 providing an electronic order processing system. The electronic order processing system may be part of a larger ordering system to process transactions relating to catalogue items a merchant offers for sale. Transactions relating to an item may include the sale of an order of catalogue items and billing a customer for those items. Database 101 comprises information on a merchant, catalogue items the merchant sells and calculation parameters for the ordered catalogue items. Database 101 is associated with e-commerce system 100. Parameters that must be calculated to correctly record the transactions relating to a catalogue item include charges and reductions such as discounts, taxes, shipping charges, etc. It will be appreciated that the calculation rules for the parameters may be modified periodically. For example, the circumstances in which a tax rate applies may be changed or a merchant may want to amend a discount calculation. The embodiment enables modification of the calculation rules without changing the code that implements the framework for calculating parameters.

Referring to FIG. 1A, e-commerce system 100 and database 101 may exist on a stand-alone computer 102 such that all processing information and requests relating to the catalogue items in e-commerce system 100 are made on computer 102. Software and data for e-commerce system 100 and database 101 may be loaded onto information storage media, such as hard drive 104 of computer 102, or on a disk 106 in disk drive 108, or on a CD ROM 110 in CD ROM drive 112. Disk 106 and CD ROM 110 are examples of transportable information storage media enabling the loading of the software for e-commerce system 100.

A person accessing e-commerce system 100 may be a customer ordering a catalogue item or items or inquiring about a catalogue item or catalogue items. It will be appreciated that it is not necessary to actually order the catalogue items in e-commerce system 100 to calculate the parameters for the catalogue item or catalogue items. A customer can inquire about the cost of a catalogue item or catalogue items. For simplicity, when a customer invokes the method of calculating parameters by purchasing catalogue items or inquiring about catalogue items, the catalogue items purchased or inquired about are collectively referred to as an order.

Figure 1B:
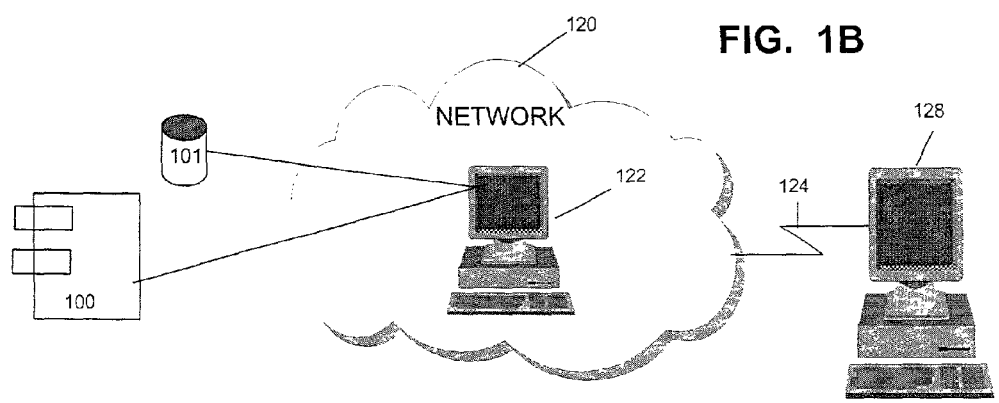
FIG. 1B is a block diagram of a computer network comprising a computer loaded with software of the e-commerce system of FIG. 1A.

Referring to FIG. 1B, e-commerce system 100 and database 101 may exist in network 120 such that computer 122 has software for e-commerce system 100 and database 101 loaded onto it. The customer, using computer 128, accesses e-commerce system 100 via connection device 124 connected to network 120. A connection device 124 may be a modem, cable link, ISDN terminal, etc. It will be appreciated that computer 128 may be a part of network 120 having software for e-commerce system 100 loaded onto it and database 101 loaded onto it. It will be appreciated by one skilled in the art that network 120 may be the Internet.

Figure 1C:
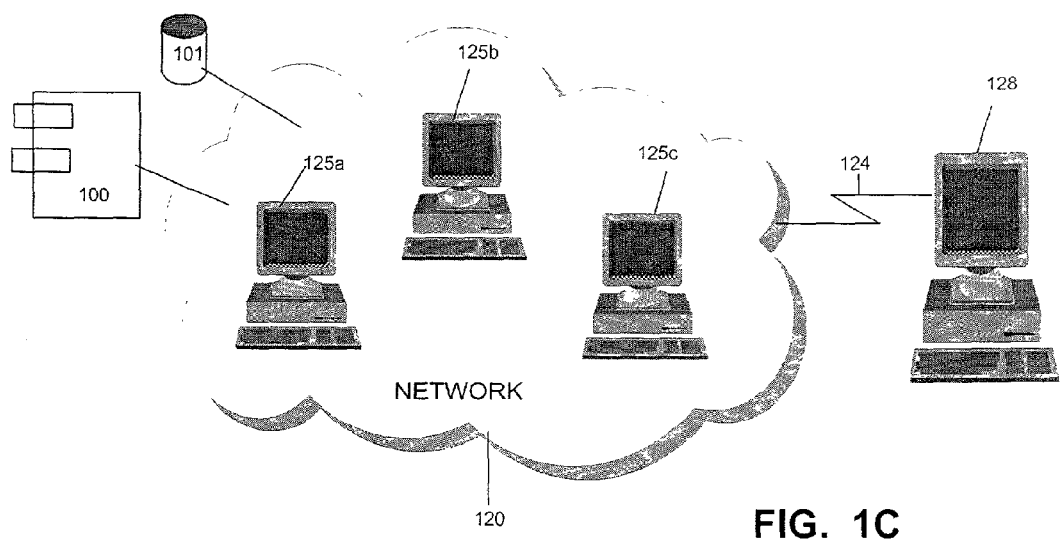
FIG. 1C is a block diagram of another computer network with several computers loaded with software to provide the e-commerce system of FIG. 1A.

Referring to FIG. 1C, network 120 comprises computers 125a, 125b, 125c. As e-commerce system 100 uses object-oriented components, e-commerce system 100 may be distributed among several computers such as computers in network 120. A program implemented using object-oriented design is able to perform operations on objects regardless of the physical location of the objects provided the physical locations are connected. Thus, different objects within e-commerce system 100 may reside on different computers and the functionality of e-commerce system 100 and database 101 may be distributed among computers 125a, 125b, and 125c. The customer accesses e-commerce system 100 similarly to FIG. 1B. It will be appreciated that e-commerce system 100 may exist on a server computer in network 120 in FIG. 1B and FIG. 1C. E-commerce system 100 would then be accessed by a client computer to process parameters for an ordered catalogue item.

It will be appreciated that the software associated with e-commerce system 100 may be downloaded from another source onto computer 102 in FIG. 1A, computer 122 in FIG. 1B, or computers 125a, 125b, and 125c in FIG. 1C.

In the embodiment, the customer accesses e-commerce system 100 using a web browser operating on computer 128, such as Microsoft Internet Explorer and Netscape Navigator. If, as in FIG. 1A, e-commerce system 100 is on a stand-alone computer 100, the software to access the system may be built into e-commerce system 100 or may be software that allows access to e-commerce system 100.

In the embodiment, customers access e-commerce system 100 and database 101 through a merchant web site. It will be appreciated by those skilled in the art that e-commerce system 100 need not be made available for communication with the customer using a web site. For example, the customer could access e-commerce system 100 remotely using connection device 124 without accessing a merchant web site. The customer chooses a catalogue item or catalogue items to order or inquire about from the list of catalogue items the merchant provides to his web site by connecting it to database 101. It will be appreciated that this manner of choosing a catalogue item or catalogue items may be implemented in a number of ways. For example, the merchant provides a drop down list of catalogue items available for sale that can be high-lighted, or the merchant provides a searchable list of catalogue items that may be added to a shopping cart when the customer presses a particular button on the web site.

The catalogue items the customer chooses are communicated to e-commerce system 100 and database 101 using connection device 124. It is then that e-commerce system 100 invokes the method and system for calculating parameters for the catalogue items chosen. The calculated parameters are communicated back to the customer at computer 128 to reflect the final adjusted price of the order again using connection device 124. It will be appreciated that the parameters calculated by e-commerce system 100 may also be output to a printer, other display device or saved on a storage medium such as a disk, hard drive, CD ROM, etc. If the customer purchases the catalogue items, the parameters will also be recorded in database 101 in order to administer the business needs of the merchant regarding invoicing, tracking sales, etc.

Referring to FIG. 2, when a customer accesses e-commerce system 100, he selects a catalogue item or catalogue items to order. For example, the customer may choose a catalogue item called "Chair". Chair is represented by catalogue item 202(a), found in database 101 and has a price of $100.00 associated with it. Additionally, in database 101, calculation code 200(a) is associated with catalogue item 202(a), indicating that a discount should be applied. Calculation code 200(a) is associated with a calculation rule 204(a). Calculation rule 204(a) indicates that the discount for catalogue item 202(a) should be 10% off the recorded price. E-commerce system 100 will apply calculation rule 204(a), and apply the result, a $10.00 discount, to the final price of the order. If this is the only calculation code 200 to be applied to ordered catalogue item 202(a), the final price of the order is reported to the customer as $90.00.

If the discount parameters applicable to calculation code 204(a) are changed, to reflect this change only calculation rule 204(a) is modified producing modified calculation rule 204(a)'. For example, if the new discount is now $25.00 off the price rather than 10% off for catalogue item 202(a), e-commerce system 100 determines that calculation code 200(a) is associated with catalogue item 202(a), and that modified calculation rule 204(a)' is associated with calculation code 200(a). Under the modified rule, e-commerce system 100 applies modified calculation rule 204(a)' to provide a $25.00 discount against the price. E-commerce system 100 then applies the discount to catalogue item 202(a). Accordingly, the final price of the order is reported on the screen of computer 128 in FIGS. 1B and 1C (computer 102 in FIG. 1A) as $75.00.

The framework of e-commerce system 100 may also be used in the same manner to calculate other parameters for ordered catalogue item 202(a). For example, if there are shipping charges that apply to ordered catalogue item 202(a) in addition to the discount that is applied, e-commerce system 100 can calculate the shipping charge. E-commerce system 100 determines that calculation code 200(b) for shipping is associated with catalogue item 202(a), and that calculation rule 204(b) is associated with calculation code 200(b). Calculation rule 204(b) indicates that the shipping charge for catalogue item 202(a) should add $2.00 to the order. E-commerce system 100 applies calculation rule 204(b) to provide a $2.00 shipping charge to the price of the order. Again, the final price of the order is reported on the screen of computer 128 in FIGS. 1B and 1C (computer 102 in FIG. 1A) as $75.00 plus $2.00 shipping to give $77.00 as the total for the order. It will be appreciated that the internal operation of the modules that associate a calculation code 200 with an item 202, associate a calculation rule 204 with a calculation code 200 and calculate a calculation rule 204 may be different depending on the kind of parameter to be calculated and how it should be calculated. However, the steps of associating calculation code 200 and calculation rule 204 and calculating calculation rule 204 will remain.

Generally, each calculation code 200 may be mapped to one or more charges or reductions associated with an ordered item. As shown in the above example, each calculation code 200 is used by e-commerce system 100 to apply zero-to-many calculation rules 204(1), 204(2), . . . 204(n) associated with it to calculate amounts for such charges and reductions to adjust the total price of the order of catalogue items 202(1), 202(2), . . . 202($k_1$) to reflect the applicable charges and reductions.

To calculate the parameters of ordered catalogue items 202(1), 202(2), . . . 202($k_1$), e-commerce system 100 identifies calculation codes 200(1), 200(2), . . . 200($m_1$) associated with ordered catalogue items 202(1), 202(2), . . . 202($k_1$). E-commerce system 100 accomplishes this by issuing queries on database 101 for each catalogue item 202 to identify the associated calculation codes 200(1), 200(2), . . . 200($m_1$). Calculation codes 200(1), 200(2), . . . 200($m_1$) may be associated with a catalogue item 202 in three ways: "directly", "indirectly", and "by default".

An ordered catalogue item 202 is "directly" associated with a calculation code 200, if a merchant or administrator of e-commerce system 100 manually associates calculation code 200 with ordered catalogue item 202. This occurs when the customer individually negotiates the parameters that apply and how they will be calculated. If there is no calculation code 200 "directly" associated with ordered catalogue item 202, e-commerce system 100 will look for a calculation code 200 "indirectly" associated with ordered catalogue item 202.

An ordered catalogue item 202 is "indirectly" associated with a calculation code 200, if there is an entry in StoreCatalogueItemCalculationCodeRel 224 with catalogue item 202 and calculation code 200. StoreCatalogueItemCalculationCodeRel 224 is a class of object that defines the relationship among store 226, catalogue item 202, and calculation code 200. Each catalogue item 202 is associated with zero-to-many calculation codes 200(1), 200(2), . . . 200(m) and each calculation code 200 is associated with zero-to-many catalogue items 202(1), 202(2), . . . 202(k). The query on database 101 to find calculation codes 200(1), 200(2), . . . 200(m) associated with catalogue item 202 will search in StoreCatalogueItemCalculationCodeRel 224. Each entry in StoreCatalogueItemCalculationCodeRel 224 also has store 226 associated with it.

Calculation code 200 is also "indirectly" associated with a catalogue item 202 when it is associated with catalogue item group 220 that contains catalogue item 202. Catalogue item group 220 categorizes catalogue items 202(1), 202(2), . . . 202(k) allowing calculation code 200 to be assigned for one instance of catalogue item group 220, i.e. for the category represented by catalogue item group 220, rather than for each catalogue item 202 in the category individually.

Relationship 222 indicates that each catalogue item group 220 may be associated with zero-to-many catalogue items 202(1), 202(2), . . . 202(k) and each catalogue item 202 may be associated with zero-to-many catalogue item groups 220(1), 220(2), . . . 220(j).

The query to database 101 for calculation codes 200(1), 200(2), ... 200(m) "indirectly" associated with catalogue item 202 using catalogue item group 220 is done in two steps. First, a query on database 101 returns each catalogue item group 220 to which each catalogue item 202 belongs. E-commerce system then searches in StoreCatalogueItemGroupCalculationCodeRel 230 for calculation codes 200(1), 200(2), ... 200(m) associated with each catalogue item group 220. StoreCatalogueItemGroupCalculationCodeRel 230 is a class of object that defines relationships among store 226, catalogue item group 220, and calculation code 200. If a catalogue item group 220 is associated with calculation code 200, this relationship is recorded in StoreCatalogueItemGroupCalculationCodeRel 230. This entry will also have store 226 associated with it.

If a calculation code 200 is neither "directly" nor "indirectly" associated with a catalogue item 202, e-commerce system 100 will search for a default calculation code 200 for store 226 associated with catalogue item 202. StoreEntityCalculationUsageRel 266 is a class of object that defines relationships among store entity 260, calculation code 200, and calculation usage 228 (described later). If there is a default calculation code 200 for a store 226 or a store entity 260, this relationship will be recorded in StoreEntityCalculationUsageRel 266. StoreEntityCalculationUsageRel 266 will also have a calculation usage 228 associated with it so that a default calculation code 200 may be provided for each calculation usage 228.

Store entity 260 is a generalization of store 226, as indicated by relationship 258.

Additionally, store entity 260 is a generalization of a store group class (not shown). E-commerce system 100 uses the store group class to serve merchants at the "mall" level, that is, providing the same functionality for each store 226 in the store group. As the children of store entity 260, store 226 and store group inherit the properties of store entity 260, including the relationship with a default calculation code 200. E-commerce system 100 allows association of a default calculation code 200 with a store group. This allows the association of a calculation code 200 for each store 226 in the store group without having to individually associate a default calculation code 200 for each store 226.

The identified associations of calculation codes 200(1), 200(2), ... 200(x), $x \in \{1, 2, \ldots m_1\}$ with a catalogue item 202 results in catalogue item 202 having calculation codes 200(1), 200(2), ... 200(x), $x \in \{1, 2, \ldots m_1\}$ associated with it either "directly", "indirectly", or "by default".

There are also calculation rules 204($1_x$), 204($2_x$), ... 204($n_x$), $x \in \{1, 2, \ldots m_1\}$ associated with calculation code 200(x), $x \in \{1, 2, \ldots m_1\}$. The associations are identified by querying database 101 for each calculation code 200. The query searches the table in database 101 that corresponds to relationship 214 between calculation code 200 and calculation rule 204.

Referring to FIG. 2, relationship 214 indicates that each calculation rule 204 is associated with one, and only one, calculation code 200 but each calculation code may be associated with zero-to-many calculation rules 204(1), 204(2), ... 204(n).

For each calculation code 200(x), $x \in \{1, 2, \ldots m_1\}$, its associated calculation rules 204($1_x$), 204($2_x$), ... 204($n_x$), $x \in \{1, 2, \ldots m_1\}$ are used by e-commerce system 100 to calculate the amounts for the parameters for its associated catalogue items 202($1_x$), 202($2_x$), ... 202($k_x$), $x \in \{1, 2, \ldots m_1\}$. The calculated amounts are applied to the order to adjust the final price.

Calculation usage 210 and calculation usage 232 are attributes of calculation code 200 and CalculationMethod 234 respectively that indicate a purpose for the calculation code 200 and CalculationMethod 234 (e.g. discount, shipping, etc). Referring to FIG. 2, CalculationMethod 234 is a class of object that is a generalization for the routines CalculationCodeCombineMethod 240, CalculationCodeCalculateMethod 242, CalculationCodeApplyMethod 244, and CalculationRuleCalculateMethod 246 indicated by relationship 250. Each CalculationCodeCalculateMethod 242 object with a calculation usage 232 is an instance of the class, CalculationCodeCalculateMethod 242, to which it belongs.

CalculationMethod 234 manages the objects by being a parent class of the child classes. The child classes inherit calculation usage 232 from CalculationMethod 234. When a customer orders a catalogue item 202, e-commerce system 100 runs the framework, beginning with main module 400, for each calculation usage 228 contained in e-commerce system 100. This allows e-commerce system 100 to identify associated calculation codes 200(1), 200(2), ... 200($m_1$) with a corresponding calculation usage 210 and invoke different objects CalculationCodeCombineMethod 240, CalculationCodeCalculateMethod 242, CalculationCodeApplyMethod 244, and CalculationRuleCalculateMethod 246 with a corresponding calculation code 232 to correctly calculate the parameters for this calculation usage 228.

Defining calculation usage 210 and calculation usage 232 as an attribute allows the addition of new values of the attribute without changing the relationships between the classes of objects in e-commerce system 100. To introduce a new calculation usage 228, a new object is added to describe it into calculation usage 228. New objects CalculationCodeCombineMethod 240, CalculationCodeCalculateMethod 242, CalculationCodeApplyMethod 244, and CalculationRuleCalculateMethod 246 are added, if required, into the appropriate classes with a corresponding new calculation usage 232. At least one new calculation code 200 is added with a corresponding calculation usage 210.

Referring to FIG. 3, the embodiment allows for more complicated calculations to be processed by e-commerce system 100. When a customer makes an order, e-commerce system determines whether each calculation code 200 should be applied to each catalogue item 202. This determination is called qualification. Qualification of each calculation code 200 is performed by CalculationCodeQualifyMethod 302 which returns a list of catalogue items 202 ($1_x$), 202($2_x$), 202($k_x$), $x \in \{1, 2, \ldots m_1\}$ associated with each calculation code 200. If calculation code 200 should not be associated with a catalogue item 202, catalogue item 202 is not returned in the list of catalogue items 202($1_x$), 202($2_x$), ... 202($k_x$), $x \in \{1, 2, \ldots m_1\}$. It will be appreciated that this is a selective process.

The results of the qualification of a calculation code 200 depend on the circumstances under which the merchant wants calculation code 200 to apply. For example, a discount may only apply to catalogue items 202(1), 202(2), ... 202(k) ordered on a Monday or only between the hours of 7 a.m. and 9 a.m. Each different manner of qualification would be recorded as a CalculationCodeQualifyMethod 302 that would be used depending on the calculation usage 228.

Calculation rules 204(1), 204(2), ... 204(n) may also be qualified. CalculationRuleQualifyMethod 310 will evaluate the attributes of calculation rule 204 to determine if it should apply to catalogue item 202. One such attribute is effective TimeRange attribute 312. If calculation rule 204 is outside of this range, it does not qualify. It will be appreciated that this is also a selective process.

Additionally, e-commerce system 100 uses sequence attribute 304 of calculation code 200 to determine the sequence in which calculation codes 200(1), 200(2), . . . 200($m_1$) should be used to identify and apply calculation rules 204($1_x$), 204($2_x$), . . . 204($n_x$), x∈{1, 2, . . . $m_1$} to catalogue items 202($1_x$), 202($2_x$), . . . 202($k_x$), x∈{1, 2, . . . $m_1$}. The sequence attribute 304 is used to ensure the calculations are performed correctly.

For example, one calculation code 200 for a discount for a percentage of the value of the order must be calculated and applied before another calculation code 200 for a discount for a fixed amount off the order price. In this case, the customer should receive the larger discount by calculating the percentage discount first. Sequence attribute 304 ensures that this occurs by assigning the first discount calculation code 200 a lower sequence attribute 304 number than the second discount calculation code 200.

E-commerce system 100 uses allowable calculation attribute 306 to determine which calculation rules 204($1_x$), 204($2_x$), . . . 204($n_x$), x∈{1, 2, . . . $m_1$} associated with a calculation code 200(x), x∈{1, 2, . . . $m_1$} may be combined with each other. This attribute is used to selectively apply calculation rules 204($1_x$) 204($2_x$), . . . 204($n_x$), x∈{1, 2, . . . $m_1$}. Allowable combination attribute 306 may be one of "in combination with", "not in combination with", and "in addition to". "In combination with" indicates that calculation rule 204 may be applied in combination with any other calculation rule 204 that has allowable combination attribute 306 "in combination with". "Not in combination with" indicates that calculation rule 204 may not be applied in combination with any other calculation rule 204 that has allowable combination attribute 306 "in combination with" or "not in combination with". "In addition to" indicates that calculation rule 204 may be applied in addition to any other calculation rule 204 regardless of allowable combination attribute 306 of the other calculation rule 204.

As stated previously, calculation usage 210 and calculation usage 232 are attributes of calculation code 200 and CalculationMethod 234 respectively that indicate a purpose for the calculation code 200 and CalculationMethod 234 (e.g. discount, shipping, etc). CalculationMethod 234 is also a generalization of CalculationCodeQualifyMethod 302, CalculationRuleCombineMethod 308, and CalculationRuleQualifyMethod 310. This is again indicated by relationship 250. CalculationMethod 234 manages the objects by being a parent class of the child classes. The child classes inherit calculation usage 232 from CalculationMethod 234. This allows e-commerce system 100 to and invoke different objects CalculationCodeQualifyMethod 302, CalculationRuleCombineMethod 308, and CalculationRuleQualifyMethod 310 with a corresponding calculation code 232 to correctly calculate the parameters for this calculation usage 228.

Relationship 258 indicates that store entity 260 is a generalization of store 226. Additionally, store entity 260 is a generalization of a store group class (not shown). A merchant may operate one store 226 or more served by e-commerce system 100 and may also be a member of a store group.

E-commerce system 100 has the flexibility to calculate amounts for multiple calculation codes 200(1), 200(2), . . . 200(m) for a store 226 when there is more than one store 226 administered by e-commerce system 100 and when the store 226 is a member of a store group within e-commerce system 100. This functionality allows one software package containing e-commerce system 100 to be used for multiple merchants and multiple malls. It will be appreciated that an entrepreneur may provide e-commerce system 100 to customers on behalf of a merchant, several merchants or even groups of merchants using both the store 226 and store group classes of object.

Referring to FIGS. 4, 5, and 6, elements in square brackets "[ . . . ]" in the pseudo-code listings are optional, while elements in curly brackets "{ . . . }" are instantiated one or more times.

Referring to FIG. 4, operation details of main module 400 for calculation usage 232 for both shipping and discounts are provided. Main module 400 begins in line 401 by calling CalculationCodeCombineMethod 240 with list 408 of ordered catalogue items 202(1), 202(2), . . . 202($k_1$) passed as parameters. At line 402, CalculationCodeCombineMethod 240 routine returns with list 510 of associated calculation codes 200(1), 200(2), . . . 200($m_1$) each with a list of catalogue items 202($1_x$), 202($2_x$), . . . 202($k_x$), x∈{1, 2, . . . $m_1$}. The associated calculation codes 200(1), 200(2), . . . 200($m_1$) are used to find associated calculation rules 204($1_x$), 204($2_x$), . . . 204($n_x$), x∈{1, 2, . . . $m_1$} which are then used to calculate amounts for parameters.

For each calculation code 200(x), x∈{1, 2, . . . $m_1$} in list 514 (line 403), if there has not been a list of amounts 520 already calculated for each catalogue item 202 (line 404), CalculationCodeCalculateMethod 242 is called in line 405. CalculationCodeCalculateMethod 242 is sent list 410 comprising ordered catalogue items 202($1_x$), 202($2_x$), . . . 202($k_x$), x∈{1, 2, . . . $m_1$} associated with calculation code 200(x), x∈{1, 2, . . . $m_1$} to calculate amounts for ordered catalogue items 202($1_x$), 202($2_x$), . . . 202($k_x$), x∈{1, 2, . . . $m_1$}. Main module 400 receives the list of amounts 612' (described later) for ordered catalogue items 202($1_x$), 202($2_x$), . . . 202($k_x$), x∈{1, 2, . . . $m_1$} returned by CalculationCodeCalculateMethod 242 in line 406. The list 612' is applied to affect the price of the order in line 407 by calling CalculationCodeApplyMethod 244 with list 612'. Main module 400 then continues to process calculation codes 200(x), x∈{1, 2, . . . $m_1$} by returning to line 403 until each list of amounts 520 or list of amounts 612' for the parameters have been calculated and applied.

Referring to FIG. 5, details of CalculationCodeCombineMethod 240 for calculation usage 232 for both shipping and discounts are provided. CalculationCodeCombineMethod 240 first determines the associated calculation codes 200(1), 200(2), . . . 200($m_1$) for this list of ordered catalogue items 202(1), 202(2), . . . 202($k_1$) in line 501. List 510 is returned as per the code in line 502. Each calculation code 200 (line 503) in list 510 is then qualified by calling CalculationCodeQualifyMethod 302 in line 504. Line 505 returns from CalculationCodeQualifyMethod 302 with a list 512 of qualified calculation codes 200(1), 200(2), . . . 200($m_1$), each with a list of catalogue items 202(1), 202($2_x$), . . . 202($k_x$), x∈{1, 2, . . . $m_1$}. As stated previously, the returned list 512 from CalculationCodeQualifyMethod 302 in line 505 contains ordered catalogue items 202($1_x$), 202($2_x$), . . . 202($k_x$), x∈{1, 2, . . . $m_1$} representing only the ordered catalogue items 202($1_x$), 202($2_x$), . . . 202($k_x$), x∈{1, 2, . . . $m_1$} which should be associated with the corresponding calculation code 200(x), x∈{1, 2, . . . $m_1$}. This is a selective process. Lines 503 to 505 produce a modified list 510' of calculation codes 200(1), 200(2), . . . 200($m_1$), each with a list of catalogue items 202($1_x$), 202($2_x$), . . . 202(k), x∈{1, 2, . . . $m_1$}. List 510' may be different from list 510 because of the qualification of some calculation codes 200(x), x∈{1, 2, . . . m₁} (described earlier) and the possible addition of a list of amounts 520 for each catalogue item 202 from each list 512.

A list of amounts 520 may be calculated for one or more ordered catalogue items 202(1$_x$), 202(2$_x$), . . . 202($k_x$), x∈{1, 2, . . . m₁} during the execution of CalculationCodeQualifyMethod 302. List of amounts 520 would be calculated and included in list 512 if CalculationCodeQualifyMethod 302 finds it necessary to calculate list of amounts 520 for the parameters for ordered catalogue items 202(1$_x$), 202(2$_x$), . . . 202($k_x$), x∈{1, 2, . . . m₁} in order to qualify a calculation code 200 as being properly associated with its catalogue items 202(1$_x$), 202(2$_x$), . . . 202($k_x$), x∈{1, 2, . . . m₁}. This will depend on the conditions placed on the calculation code 200 as to when it applies. For example, a discount may not apply unless the customer orders over a certain dollar value for a type of catalogue item 202 in a catalogue item group 220. To determine if the customer qualifies for the discount, CalculationCodeQualifyMethod 302 calculates the dollar value of catalogue item group 220 in the order. List of amounts 520 is passed back from CalculationCodeQualifyMethod 302 so that calculations do not have to be repeated by e-commerce system 100 once they have been carried out. Each amount in list of amounts 520 is associated with a category. The category represents the parameter that has been calculated to give this amount. For example, an amount that has been calculated for a Provincial sales tax will be associated with a category that indicates this is the amount for the Provincial sales tax.

Referring to FIG. 5 in line 506, once list 510' is returned from CalculationCodeQualifyMethod 302, it is sorted using sequence attribute 304 of calculation codes 200(1), 200(2), . . . 200($m_1$). Calculation codes 200(1), 200(2), . . . 200($m_1$) are sorted with those with lower sequence attribute 304 appearing in list 514 before others with higher sequence attribute 304. The sorting routine produces sorted list 514. CalculationCodeCombineMethod 240 then returns sorted list 514 in line 507. List 514 returns in main module 400 in FIG. 4 in line 402.

Referring to FIG. 6, details of CalculationCodeCalculateMethod 242 for calculation usage 232 for both shipping and discounts are provided. CalculationCodeCalculateMethod 242 first calls CalculationRuleCombineMethod 308 in line 601 with list 410, a list of ordered catalogue items 202(1$_x$), 202(2$_x$), . . . 202($k_x$), x∈{1, 2, . . . m₁} associated with calculation code 200(x), x∈{1, 2, . . . m₁}. CalculationRuleCombineMethod 308 calls CalculationRuleQualifyMethod 310 to qualify each calculation rule 204, i.e. determine if each of the calculation rules 204(1$_x$), 204(2$_x$), . . . 204($n_x$), x∈{1, 2, . . . m₁} should be applied to each of the ordered catalogue items 202(1$_x$), 202(2$_x$), . . . 202($k_x$),x∈{1, 2, . . . m₁}. This is a selective process. If the results of CalculationRuleQualifyMethod 310 indicate that calculation rule 204 should not be applied to catalogue item 202, calculation rule 204 is not associated with calculation code 200. Accordingly, the list of calculation rules 204(1$_x$), 204(2$_x$), . . . 204($n_x$), x∈{1, 2, . . . m₁} returned from CalculationRuleCombineMethod 308 will not contain the calculation rule 204.

CalculationRuleCombineMethod 308 then determines which qualified calculation rules 204(1$_x$), 204(2$_x$), . . . 204($n_x$), x∈{1, 2, . . . m₁} may be combined with each other according to allowable calculation attribute 306. It calculates an amount for each possible combination of calculation rules 204(1$_x$), 204(2$_x$), . . . 204($n_x$), x∈{1, 2, . . . m₁} to determine which combination produces the lowest result for the final amount of the order. Accordingly, CalculationRuleCombineMethod 308 may produce a list of amounts 520 for each catalogue item 202. CalculationRuleCombineMethod 308 returns a list of qualified calculation rules 204(1), 204(2), . . . 204($n_x$'), x∈{1, 2, . . . m₁} that produce the lowest result as associated with calculation code 200(x), x∈{1, 2, . . . m₁} in line 602. It will be appreciated that CalculationRuleCombineMethod 308 selectively chooses the qualified calculation rules 204(1), 204(2), . . . 204($n_x$'), x∈{1, 2, . . . m₁} to be applied.

For each calculation rule 204 of calculation code 200 (line 603), if a list of amounts 520 has not been calculated (line 604), CalculationRuleCalculateMethod 246 is called in line 605 which returns an amount 610 representing a parameter for each ordered catalogue item 202 in a list of ordered catalogue items 202(1$_x$), 202(2$_x$), . . . 202($k_x$), x∈{1, 2, . . . m₁}. Each amount 610 is associated with each ordered catalogue item 202. Amount 610 is associated with a category and represents an amount for a parameter for ordered catalogue item 202 as calculated by e-commerce system 100 using calculation rule 204.

Amount 610 and list of amounts 520 are then added to a running list of amounts 612 for each ordered catalogue item 202 in line 607. CalculationCodeCalculateMethod 242 then returns to continue processing each calculation rule 204 in the list of qualified calculation rules 204(1), 204(2), . . . 204($n_x$'), x∈{1, 2, . . . m₁} as per line 603. When the calculation rules 204(1), 204(2), . . . 204($n_x$'),x∈{1, 2, . . . m₁} have been processed to compile a completed list of amounts 612' for each ordered catalogue item 202 in the list of ordered catalogue items 202(1$_x$), 202(2$_x$), . . . 202($k_x$), x∈{1, 2, . . . m₁}, list 612' is returned to main module 400 in line 608.

Figure 9:
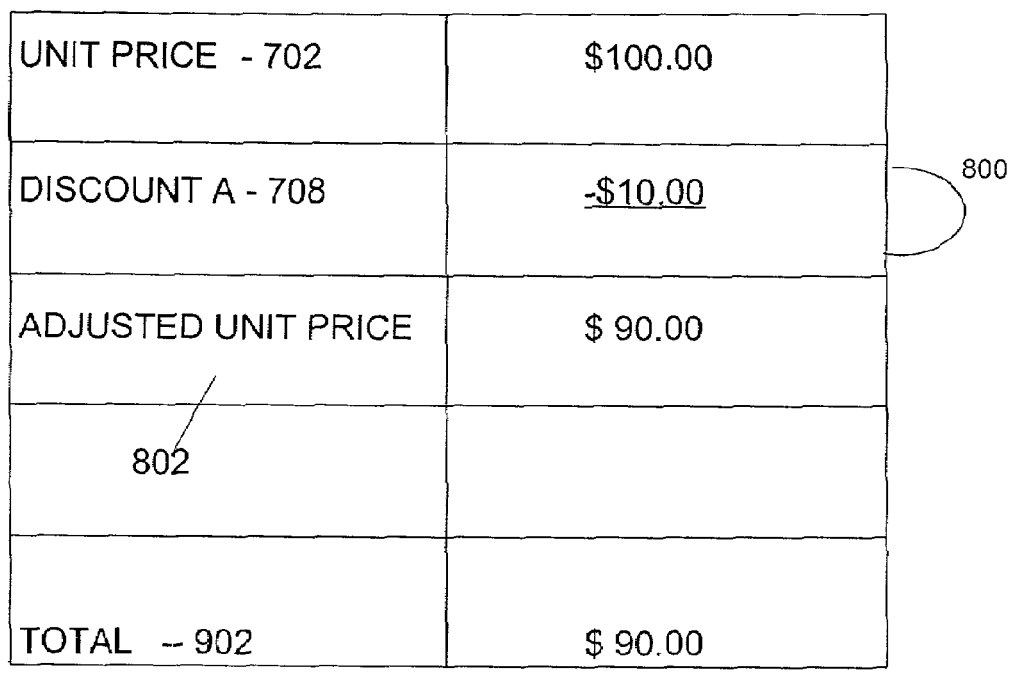
FIG. 9 is a table of results produced by the e-commerce system for the example of FIG. 7.

FIGS. 7, 8, and 9 illustrate a simple example of ordering a catalogue item 202 and calculating the parameters for catalogue item 202. FIG. 7 contains the information available to e-commerce system 100 to calculate the parameters of catalogue item 202. FIG. 8 illustrates a walk-through of the pseudo-code in FIGS. 4, 5, and 6 for the example. FIG. 9 illustrates the final result from e-commerce system 100 for this example.

Referring to FIG. 7, ordered catalogue item 202 is boots 700. Boots 700 have unit price 702 of $100.00. The unit price 702 of boots 700 is stored in database 101 in the table that records the information concerning ordered catalogue items 202(1), 202(2), . . . 202($k_x$). Boots 700 has one calculation code 200 associated with it, discount 706. Discount 706 has one calculation rule 204 associated with it, discount A 708. Discount A 708 is a calculation rule 204 that defines a relationship that, when applied, e-commerce system 100 calculates a 10% discount for boots 700. In this example, there will be no optional list of amounts 520 calculated. It will be appreciated that list of amounts 520 may be calculated in other circumstances, i.e. when CalculationCodeQualifyMethod 302 or CalculationRuleQualifyMethod 310 calculate amounts to determine if a calculation code 200 or calculation rule 204 should be applied given the price of the order.

Referring to FIG. 8, at line 801 CalculationCodeCombineMethod 240 is called with boots 700 passed as a parameter. In line 802 CalculationCodeCombineMethod 240 associates discount 706 with boots 700 which is returned in line 803. Since there is only one calculation code 200, discount 706, CalculationCodeQualifyMethod 302 is called once in line 804. It will be appreciated that CalculationCodeQualifyMethod 302 is called for each associated calculation code 200. In the example, discount 706 is correctly associated with boots 700 since there are no conditions on when to apply it so discount 706 is returned in line 805. The list of qualified calculation codes 510' is sorted in line 806 to give sorted list 514 of discount 706 associated with boots 700. List 514 is returned to main module 400 in line 807.

For each calculation code 200, main module 400 executes a loop beginning on line 808 and ending with line 819. Since list of amounts 520 is not being calculated in this example, the statements inside the conditional statement from line 404 of FIG. 4 as shown on line 809 are executed. Line 810 calls CalculationCodeCalculateMethod 242 and passes it the list of discount 706 associated with boots 700. CalculationCodeCalculateMethod 242 immediately calls CalculationRuleCombineMethod 302 in line 811 which returns discount A 708 as a qualified calculation rule 204 for boots 700 in line 812.

For each calculation rule 204, CalculationCodeCalculateMethod 242 executes a loop beginning on line 813 and ending with line 816. Since list of amounts 520 is not being calculated in this example, the statements inside the conditional statement from line 604 of FIG. 6 as shown on line 813 are executed. CalculationRuleCalculateMethod 246 is called on line 814 with discount A 708 and boots 700 as parameters. CalculationRuleCalculateMethod 246 calculates the $10.00 discount 800 as shown on line 815. The $10.00 discount 800 is summed into list 610' in line 816. The summed list 610' is returned to main module 400 in line 817.

In line 818 discount 800 of $10.00 is applied to adjust the order price by calling CalculationCodeApplyMethod 244. The application produces an adjusted unit price 802 of boots 700 as $90.00. As this is the only calculation code 200, the loop of lines 808 to 819 represent the only iteration of the loop of lines 403 to 407 of FIG. 4 for this example.

Referring to FIG. 9, unit price 702 of boots 700 has the $10.00 discount 800 from discount A 708 applied to it. This gives adjusted unit price 802 as $90.00 and total 902 as $90.00. The total 902 is calculated after the calculation codes 200(1), 200(2), . . . 200($m_1$) are applied to produce parameters for the ordered catalogue items 202(1), 202(2), . . . 202($k_1$) in the order.

FIGS. 10, 11, and 12 provide a second example of ordering a catalogue item 202 and calculating the parameters for catalogue item 202. The example illustrates additional features of e-commerce system 100 for calculating parameters for a catalogue item 202. FIG. 10 contains the information available to e-commerce system 100 to calculate the parameters of each catalogue item 202. FIG. 11 is a walkthrough of the pseudo-code in FIGS. 4, 5, and 6 for the example. FIG. 12 is the final result from e-commerce system 100 for this example.

Referring to FIG. 10, the order in the second example consists of boots 1000, shoes 1002, and socks 1004. Note that there are two pairs of shoes 1002 ordered. Two calculation codes 200(1) and 200(2) are associated with boots 1000, shoes 1002, and socks 1004, namely shipping code 1 1010 and shipping code 2 1014. Each calculation code 200 has a sequence attribute 304. Four calculation rules 204(1), 204(2), 204(3) and 204(4) are associated with shipping code 1 1010, namely shipping A 1020, shipping surcharge A 1022, shipping surcharge B 1024 and shipping D 1026. Shipping A 1020, shipping surcharge A 1022, shipping surcharge B 1024 are to be applied to orders to be sent within the country while shipping D 1026 is for orders to be sent outside of the country. There is only one calculation rule 204 associated with shipping code 2 1014, shipping X 1028. Each calculation rule 204 has an allowable combination attribute 306.

Referring to FIG. 11, the second example is used to highlight additional features of e-commerce system 100.

Beginning in line 1101, main module 400 calls CalculationCodeCombineMethod 242 with parameters boots 1010, shoes 1012 x 2, socks 1014. CalculationCodeCombineMethod 242 finds each associated calculation code 200 in line 1102. The result is the association of shipping code 1 1010 and shipping code 2 1014 with boots 1000, shoes 1002, and socks 1004 as shown on lines 1103 and 1104. CalculationCodeQualifyMethod 302 qualifies shipping code 1 1010 and shipping code 2 1014 in lines 1105 to 1107 as in two iterations of lines 503 to 505 in FIG. 5. Referring to FIG. 11, lines 1107 and 1108, CalculationCodeQualifyMethod 302 selectively associates shipping code 2 1014 with only shoes 1002 and not boots 1000 and socks 1004. This is because a condition is set on calculation code 200 shipping code 2 1014 so that only items purchased in multiples qualify for shipping code 2 1014. The returned list in line 1108 does not have the association between boots 1000 or socks 1004 and shipping code 2 1014.

Referring to FIG. 11, lines 1109 and 1110, sequence attribute 304 of calculation code 200 is used to determine the sequence in which shipping code 1 1010 and shipping code 2 1014 are applied to boots 1000, shoes 1002, and socks 1004. The example in FIG. 11 then continues operating in the same way as the example in FIG. 8.

Referring to FIG. 10, shipping code 1 1010 has four calculation rules 204(1), 204(2), 204(3) and 204(4) associated with it. These are shipping A 1020, shipping surcharge A 1022, shipping surcharge B 1024 and shipping D 1026. However in FIG. 1, CalculationRuleCombineMethod 308 from line 1128 does not return all four calculation rules 204(1), 204(2), 204(3) and 204(4) in lines 1129 and 1130. In the second example, it is assumed that we are within effectiveTimeRange attribute 312 so that shipping surcharge A 1022 applies when CalculationRuleQualifyMethod 310 is called.

All four calculation rules 204(1), 204(2), 204(3) and 204(4) do not apply because shipping D 1026 is for shipments outside of the country. Since the customer's shipping address is inside the country, CalculationRuleQualifyMethod 310 selectively associates shipping A 1020, shipping surcharge A 1022 and shipping surcharge B 1024 with shipping code 1 1010 and not shipping D 1026.

After returning from CalculationRuleQualifyMethod 310, CalculationRuleCombineMethod 308 evaluates allowable combination attribute 306 of each qualified calculation rule 204. This will select the rules to apply to boots 1000, shoes 1002, and socks 1004. Shipping A 1020 has allowable combination attribute 306 as "in addition to", shipping surcharge A 1022 has allowable combination attribute 306 as "in combination with", and shipping surcharge B 1024 has allowable combination attribute 306 as "not in combination with". Either shipping surcharge A 1022 or shipping surcharge B 1024 applies since shipping surcharge B 1024 may not be combined with a calculation rule 204 with allowable combination attribute 306 as "in combination with". Shipping A 1020 always applies because its allowable combination attribute 306 has a value of "in addition to". Since using shipping surcharge A 1022 and shipping A 1020 gives a lower shipping charge than using shipping surcharge B 1024 and shipping A 1020, CalculationRuleCombineMethod 308 returns shipping surcharge A 1022 and shipping A 1020 in lines 1128 and 1129 as applying to boots 1000, shoes 1002, and socks 1004.

Referring to FIG. 12, e-commerce system 100 applies the calculation results to give a total 1200 for the order of $200.80.

Although it is not shown it will be appreciated that the internal workings of CalculationCodeCombineMethod 240, CalculationCodeCalculateMethod 242, CalculationCodeApplyMethod 244, CalculationRuleCalculateMethod 246, 302, CalculationRuleCombineMethod 308, and CalculationRuleQualifyMethod 310 may be different for shipping than it is for discounts. It will also be appreciated that the framework of e-commerce system 100, beginning with main module 400, will be called to calculate the parameters associated with each calculation usage 228.

Figure 13:
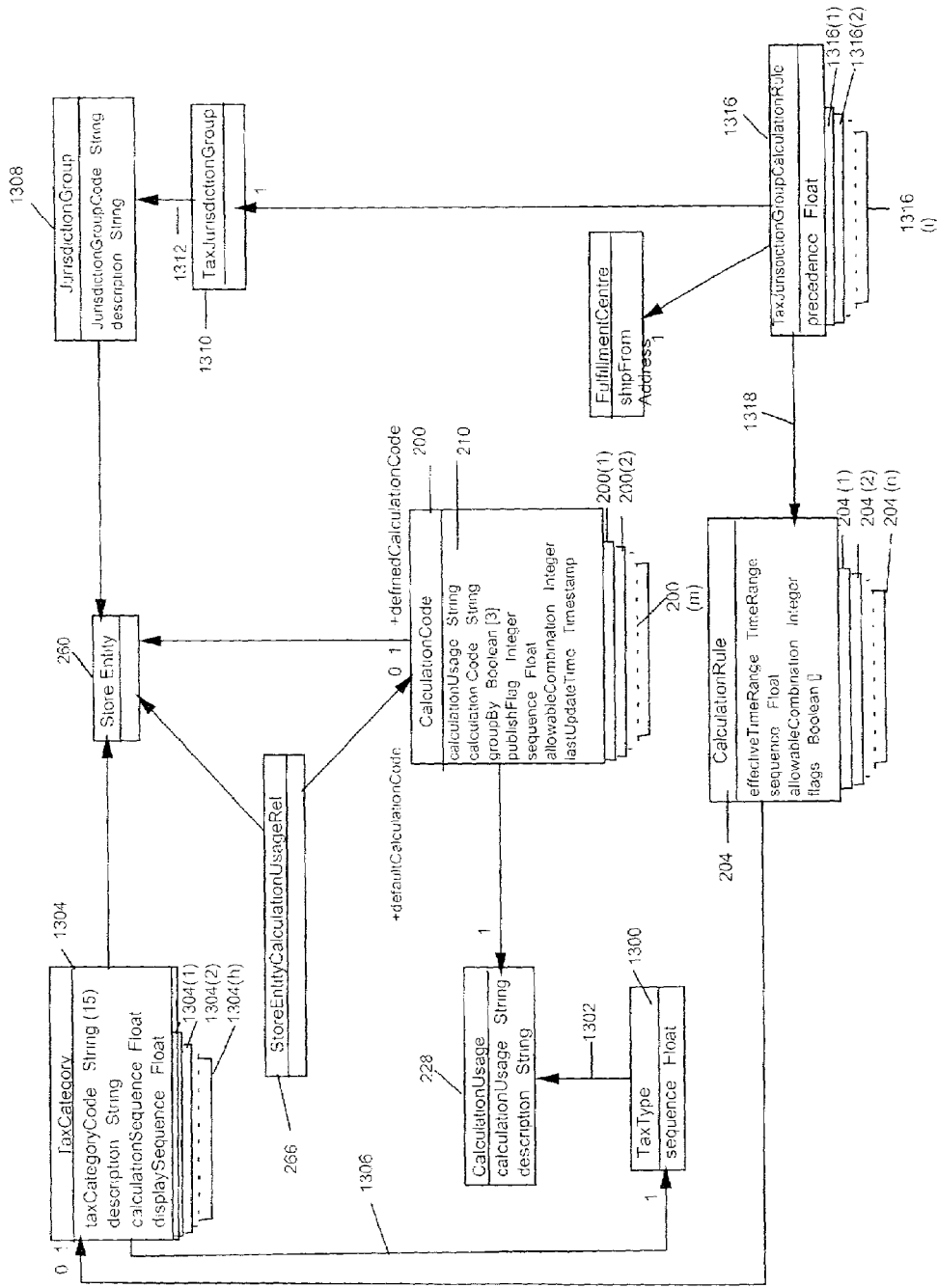
FIG. 13 is a block diagram showing relationships among additional components of the e-commerce system of FIG. 1A.

Referring to FIG. 13, taxes may be calculated by e-commerce system 100 using the system and method for calculating parameters for items as described above. A tax calculation code 200 and a tax calculation rule 204 function the same way other calculation codes 200(1), 200(2), ... 200(m) or calculation rules 204(1), 204(2),.. 204(n). However, taxes require additional instructions in order to be calculated properly in e-commerce system 100.

When identifying calculation codes 200(1), 200(2), ... 200($m_1$) associated with a catalogue item 202, there may be more than one calculation code 200 that deals with taxes associated with catalogue item 202. CalculationCodeCombineMethod 240 will only return the calculation code 200 with the lowest sequence attribute 304 as associated with catalogue item 202.

E-commerce system 100 contains a tax type 1300 class of object. Tax type 1300 indicates the kind of taxes that may be calculated by e-commerce system 100 e.g. shipping tax, sales tax, etc.

Calculation usage 228, which indicates a purpose, is a generalization of tax type 1300, as shown by the open arrow in relationship 1302. That means tax type is a specific category of calculation usage 228. A calculation code 200 that deals with taxes will have a calculation usage 210 that corresponds to tax type 1300.

Tax category 1304 is a class of object in e-commerce system 100. Tax category 1304 corresponds to the kind of taxes within a tax type 1300 that may be calculated. For example, the Canadian Goods and Services Tax (GST) and Provincial sales taxes are tax categories 1304(1), 1304(2), ... 1304(h) within tax type 1300 for sales tax. A tax type 1300 is associated with zero-to-many tax categories 1304(1), 1304(2), ... 1304(h) but each tax category 1304 is associated with one, and only one, tax type 1300. This is shown by relationship 1306 in FIG. 13. A calculation rule 204 that deals with taxes will have a tax category 1304 associated with it.

When e-commerce system 100 qualifies a tax calculation rule 204, CalculationRuleQualifyMethod 310 will examine tax category 1304 associated with calculation rule 204 as well as the jurisdiction of the shipping address and the centre from which the product is shipped. To correctly apply the taxes applicable to a given jurisdiction, e-commerce system 100 maintains a jurisdiction group 1308 class of object. This is a generalization of the tax jurisdiction group 1310 class of object. The generalization is shown by the open arrow of relationship 1312 in FIG. 13.

A shipping address may be contained in more than one jurisdiction group 1308 or tax jurisdiction group 1310. For example, an address in Toronto would fall into the tax jurisdiction group 1310 for Canada and the tax jurisdiction group 1310 for Ontario. If the shipping address falls into more than one jurisdiction group 1308, each having a different calculation rule 204 associated with it, precedence attribute 1314 of the class of object TaxJurisdictionGroupCalculationRule 1316 determines which calculation rule 204 will apply to calculate the appropriate taxes. The solid diamond in relationship 1318 shows that each calculation rule 204 is associated with zero-to-many TaxJurisdictionGroupCalculationRules 1316(1), 1316(2), ... 1316(i) and that each TaxJurisdictionGroupCalculationRule 1316 is associated with one, and only one, calculation rule 204. Only a calculation rule 204 that deals with taxes will be associated with a TaxJurisdictionGroupCalculationRule 1316.

There may be more than one calculation rule 204 associated with a tax category 1304. For example, there may be a calculation rule 204 based on the jurisdiction of the shipping address and one based on the jurisdiction of the centre from which the items are shipped. CalculationRuleQualifyMethod 310 will qualify only the appropriate calculation rules 204(1), 204(2), ... 204(n) based on the law governing the jurisdiction of the shipping address and the jurisdiction of the centre from which the items are shipped.

The method and system for calculating parameters for an item is implemented within e-commerce system 100 but it may be embodied in other systems using calculation rules which change. For example, other applications include an income tax calculation system where the rules for calculating taxes and deductions are subject to change or an investment system where each rule corresponds to a different investment scheme and the method of calculating return on investment are subject to change.

The embodiment of e-commerce system 100 is implemented in Java. Java is an object-oriented programming language. It will be appreciated to those skilled in the art that e-commerce system 100 may be implemented in another object-oriented programming language.

It is noted that those skilled in the art will appreciate that various modifications of detail may be made to the embodiments described herein, which would come within the spirit and scope of the invention as defined in the following claims.

The embodiments of the invention in which an exclusive property or privilege is claimed are defined as follows:

1. A method for processing a parameter for an item in an electronic order processing system, said method comprising:
   providing a plurality of calculation rules for calculating amounts for parameters of items;
   associating one or more calculation rules from the plurality of calculation rules with a calculation code, wherein the one or more calculation rules are used to produce an amount for a parameter and wherein the calculation code has an associated qualifying method that is used to determine whether the calculation code is to be applied to the item;
   associating the calculation code with an item;
   responsive to initiating application of the calculation code to the item, using the qualifying method to determine whether to apply the calculation code to the item; and
   responsive to a determination that the calculation code is to be applied to the item, using the one or more calculation rules to produce an amount for the parameter for the item; and
   providing the amount to an output device.

2. A method for processing a parameter for an item as in claim 1, wherein the calculation rule may be modified and initiating application of the calculation code to the item remains the same.

3. A method for processing a parameter for an item as in claim 1, wherein said output device is one of (a) a printer, (b) a display device, (c) a storage medium, (d) a database and (e) a connection device.

4. A method for processing a parameter for an item as in claim 1, wherein the item is one of a plurality of items, the calculation code is one of a plurality of calculation codes associated with the item and the one or more calculation rules are selected from a plurality of calculation rules associated with the calculation code.

5. A method for processing a parameter for an item as in claim 1, wherein said associating said calculation code further comprises selectively associating said calculation code with said item.

6. A method for processing a parameter for an item as in claim 1, wherein each of the plurality of calculation rules has an associated allowable calculation attribute that determines whether the calculation rule may be combined with other calculation rules.

7. A method for processing a parameter for an item as in claim 6, wherein the allowable calculation attribute has a value selected from the group consisting essentially of in combination with, not in combination with, and in addition to.

\* \* \* \* \*